United States Patent [19]
Wijdenes

[11] Patent Number: 5,977,676
[45] Date of Patent: Nov. 2, 1999

[54] ELECTROMOTOR

[75] Inventor: Jacob Wijdenes, Eindhoven, Netherlands

[73] Assignee: U.S. Philips Corporation, New York, N.Y.

[21] Appl. No.: 09/192,706

[22] Filed: Nov. 16, 1998

[30] Foreign Application Priority Data

Nov. 20, 1997 [EP] European Pat. Off. .............. 97203624

[51] Int. Cl.$^6$ ...................................................... H02K 5/16
[52] U.S. Cl. ............................................. 310/90; 384/132
[58] Field of Search ...................... 310/90; 264/DIG. 57; 384/123, 132

[56] References Cited

U.S. PATENT DOCUMENTS

| 3,778,123 | 12/1973 | Hendler et al. | 384/132 |
| 3,817,958 | 6/1974 | Moyer | 525/328.2 |
| 3,956,000 | 5/1976 | Kuhls et al. | 106/270 |
| 4,076,335 | 2/1978 | Ahmed et al. | 384/12 |
| 4,200,344 | 4/1980 | Binns et al. | 384/107 |
| 4,614,445 | 9/1986 | Gerkema et al. | 384/368 |
| 4,680,355 | 7/1987 | Nakahara et al. | 526/243 |
| 4,990,283 | 2/1991 | Visca et al. | 252/309 |
| 5,427,456 | 6/1995 | Hensel | 384/112 |
| 5,487,608 | 1/1996 | Leuthold et al. | 384/113 |
| 5,627,702 | 5/1997 | Kelemen et al. | 360/106 |
| 5,650,483 | 7/1997 | Malik et al. | 528/402 |
| 5,685,647 | 11/1997 | Leuthold et al. | 384/113 |
| 5,722,775 | 3/1998 | Thijsse et al. | 384/119 |

Primary Examiner—Nestor Ramirez
Assistant Examiner—Joseph Waks
Attorney, Agent, or Firm—Bernard Franzblau

[57] ABSTRACT

The invention relates to an electromotor comprising a stator part and a rotor part, which parts form an oil-containing spiral groove bearing system. Surface areas of said parts are provided with a so-called oil barrier in order to prevent the oil from creeping from the bearing system to the environment. According to the present invention, said oil barrier comprises a monolayer of perfluorocarboxylic acid anions, especially those having a chain length of 10–20 C-atoms and/or perfluoroalkylthiol anions. Oil barriers of this type can be easily provided on the rotor part and stator part by means of dipping. These oil barriers have a very small thickness and can very suitably be used to prevent oil creepage.

7 Claims, 1 Drawing Sheet

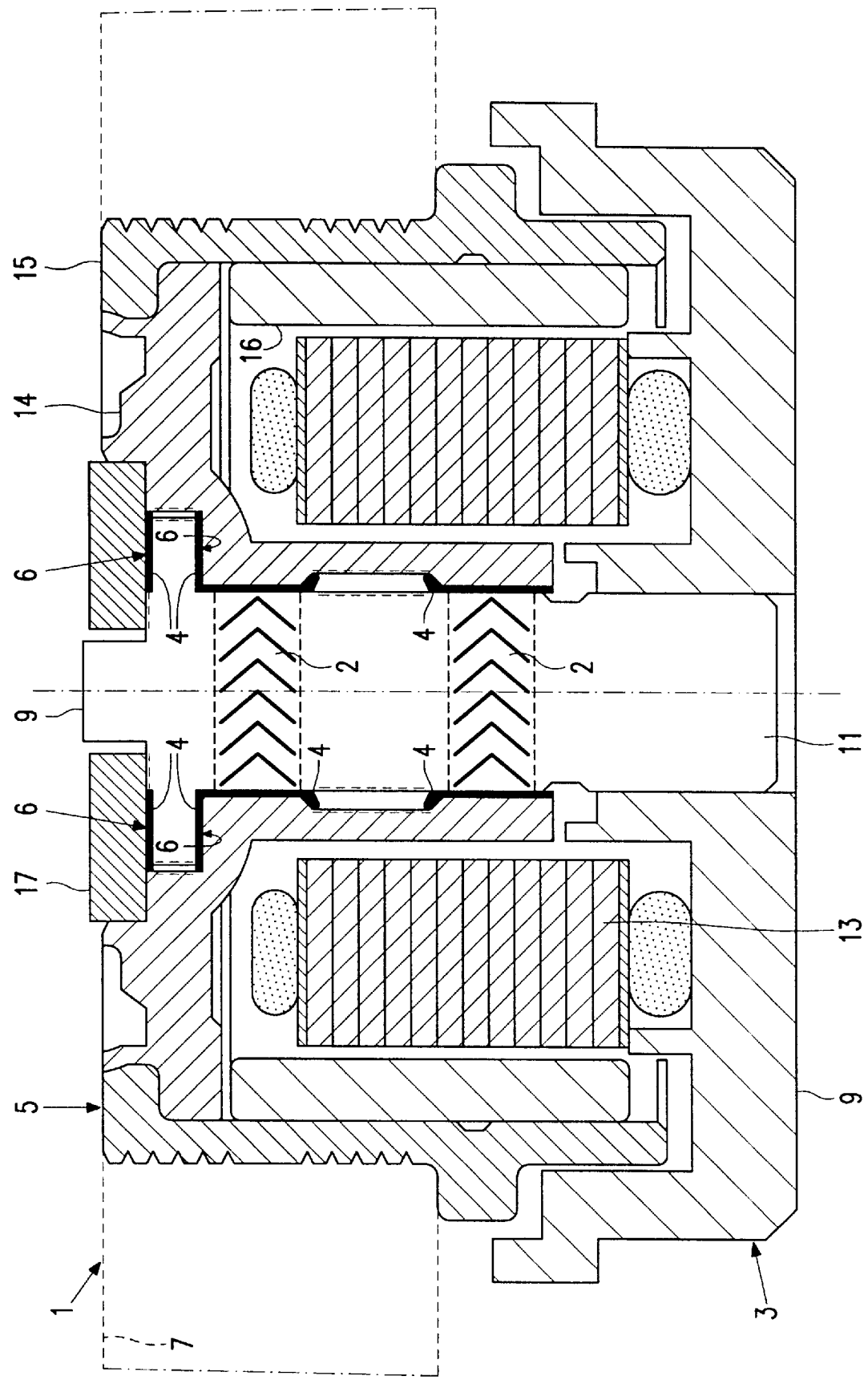

ELECTROMOTOR

BACKGROUND OF THE INVENTION

The invention relates to an electromotor comprising a rotor part and a stator part, which parts are formed into a bearing system by means of oil-containing spiral groove bearings, whereby parts of the surface of the rotor part and of the stator part are provided with an oil barrier to counteract oil creepage from the bearings. The invention also relates to a method of manufacturing such an electromotor.

An electromotor of the type mentioned in the opening paragraph is known per se, for example, from United States patent specification U.S. Pat. No. 5,427,456. Said specification more particularly describes an electromotor which can suitably be used to drive a hard disk of a computer. The known motor comprises four spiral groove bearings, namely two axial bearings and two radial bearings. To prevent oil creepage from the bearings during operation of the motor, layers are provided, for example at an end portion of the rotor part, which counteract oil creepage. Such layers are commonly referred to as "oil barriers" and "Nyebar stop". Such oil barriers customarily comprise a mixture of fluoro compounds, such as perfluoroalkanes, which are embedded in a polymer matrix.

It has been found that in some respects the known electromotors are unsatisfactory. For example, if the motor is operated at a fixed speed for a prolonged period of time, oil migration from one spiral groove bearing to the other spiral groove bearing may occur. This may cause the first spiral groove bearing to run dry, thus causing damage to the motor.

SUMMARY OF THE INVENTION

It is an object of the invention to improve the known electromotor by precluding or reducing the above-mentioned oil-migration problem. The invention more particularly aims at providing an electromotor comprising a novel type of oil barrier which precludes or at least reduces said oil migration from one spiral groove bearing to the other spiral groove bearing. The oil barrier in accordance with the invention should adhere well to the surfaces of the rotor part and the stator part, and mounting of said oil barrier on these parts should be easy.

These and other objects of the invention are achieved by an electromotor comprising a rotor part and a stator part, which parts are formed into a bearing system by means of oil-containing spiral groove bearings, whereby portions of the surface of the rotor part and the stator part are provided with an oil barrier to counteract oil creepage from the bearings, characterized in that the oil barrier comprises a monolayer, which is predominantly composed of perfluorocarboxylic acid anions and/or perfluoroalkylthiol anions.

Experiments leading to the present invention have shown that oil barriers comprising a monolayer which is predominantly composed of perfluorocarboxylic acid anions and/or perfluoroalkyithiol anions can be applied as a very thin layer. Oil barriers of this type having a thickness below 10 nm, and even below 5 nm, prove to be very satisfactory in practice. By virtue thereof, such oil barriers can be provided internally, that is between adjacent spiral groove bearings, without special adaptations of the rotor part or the stator part being necessary. It is noted that this is not possible with the customary Nyebar-type oil barriers. These have a minimum thickness of many micrometers, so that they are suitable only for external use. Further, it has been found that internal use of Nyebar oil barriers causes contamination of the spiral groove bearings. Presumably this is caused by the fact that the material is scraped during assembling the stator part and the rotor part into a complete electromotor.

Oil barriers comprising a monolayer of perfluorocarboxylic acid anions further exhibit a good adhesion to metals, in particular bronze and stainless steel. Oil carriers comprising a monolayer of perfluoroalkylthiol anions exhibit a good adhesion to metals, especially to copper, bronze, gold and silver. It has further been found in experiments that creepage of customary bearing oils is very small when these oil barriers are used. It is noted that the term perfluorocarboxylic acid anions is to be taken to mean carboxylic acid anions in which at least 90% of the C—H groups is replaced by C—F groups. The carboxylic acids and carboxylic acid salts used as the starting materials may be of the branched type, however, it has been found that linear carboxylic acids or carboxylic acid salts generally lead to an improved order in the layer. Almost the same definition holds for the perfluoroalkylthiol anions.

A favorable preferred embodiment of the invented electromotor is characterized in that the perfluorocarboxylic acid anions of the oil barrier have a chain length of 10 to 20 C-atoms. If use is made of perfluorocarboxylic acid anions having less than 10 C-atoms, the density in the layer is found to be less good. As a result, the spread of the oil used in the motor is not at a minimal level. In practice, perfluorocarboxylic anions having more than 20 C-atoms are found to be difficult to handle.

Experiments have shown that preferably also the spiral groove portion of the bearings is provided with an oil barrier composed of said monolayer. As will be apparent from the description below, this benefits the ease of manufacture. It has been found that the presence of the oil barrier on the spiral groove portion of the bearings causes the oil to remain properly concentrated in the bearings.

The invention also relates to a method of manufacturing an electromotor as mentioned in the opening paragraph, which is provided with a monolayer comprising predominantly perfluorocarboxylic acid anions. In accordance with the invention, this method is characterized in that before the stator part and the rotor part are assembled into a motor, parts of the surface of the stator part and the rotor part are treated with a solution comprising a perfluorocarboxylic acid or a perfluoroalkylthiol and/or a salt thereof.

A preferred embodiment of the invented method is characterized in that the stator part and the rotor part are subjected to a thermal treatment after they have been treated with the solution. By virtue thereof, the adhesion of the monolayer to the surface of the stator part and the rotor part is further improved. Preferably, the temperature treatment takes place at 60–90° C.

The provision of the monolayer from the solution comprising perfluorocarboxylic acid anions and/or perfluoroalkylthiol anions can be carried out in different ways. For example, the solution can be provided by spraying or printing. A variant of the invented method, which is attractive because it benefits the ease of manufacture, is characterized in that the solution is applied by means of dipping. This enables a large part of the surface of the stator part and of the inner surface of the rotor part, including the spiral groove bearings, to be provided, in a simple manner, with the oil barrier comprising a monolayer of perfluorocarboxylic acid anions and/or perfluoroalkylthiol anions.

These and other aspects of the invention will be apparent from and elucidated with reference to the embodiments described hereinafter.

BRIEF DESCRIPTION OF THE DRAWING

In the drawings:

FIG. 1 schematically shows an axial cross-sectional view of an electromotor in accordance with the invention.

It is noted that, for clarity, the Figure is not drawn to scale.

DESCRIPTION OF THE PREFERRED EMBODIMENTS

FIG. 1 schematically shows an axial cross-sectional view of an electromotor (1) in accordance with the invention, which, in this case, can suitably be used to drive a hard disk of a computer (hard disk drive). This electromotor comprises a stator part (3) and a rotor part (5). These parts are formed into a bearing system by means of two axial spiral groove bearings (2) and two radial spiral groove bearings (6) with a relatively thin layer (4) of oil. Reference numeral (7) denotes the schematically shown hard disk.

The stator part (3) predominantly comprises a base plate (9), a fixedly arranged stator shaft (11) and a stator coil (13). These parts are rigidly attached to one another in a suitable manner, for example by means of welding, pressing or gluing. The rotor part (5) comprises a hub element (14), a jacket (15), a ring magnet (16) and a closing plate (17). These parts of the rotor part are also rigidly attached to one another in a suitable manner.

A dotted line indicates the parts of the surface of the stator part and of the rotor part which, in accordance with the invention, are at least provided with an oil barrier of the above-mentioned type. These parts are situated so as to be directly adjacent the spiral groove bearings. In practice (vide infra), however, larger portions of the rotor part and stator part, including the spiral groove bearings, are provided with an oil barrier. In accordance with the invention, this oil barrier comprises a monolayer which is predominantly composed of perfluorocarboxylic acid anions and/or perfluoroalkylthiol anions. Life tests have shown that this monolayer can very suitably be used to prevent oil from spreading.

The oil barriers are provided in the following manner. The parts of the surface of the rotor part and stator part which are to be provided with the oil barrier are previously cleaned, for example by means of an UV/ozone treatment. Subsequently, these surfaces are covered for 10 minutes with a solution of approximately 0.1% by weight of f.i.a perfluorocarboxylic acid in ethanol, preferably by dipping. Next, the surface is rinsed with alcohol (ethanol) and dried. Preferably, after the drying operation, the surface is exposed to a thermal treatment at approximately 80° C. Subsequently, the rotor parts and the stator parts are assembled into an electromotor. Finally, a sufficient quantity of oil is provided, via a capillary bore (not shown) in the stator shaft (11), at the location of the spiral groove bearings.

In an attempt to optimize the action of the oil barriers, different perfluorocarboxylic acids of the type $CF_3(CF_2)_n COOH$ were tested in comparative experiments. Monolayers of perfluorooctanoic acid (n=6), perfluorodecanoic acid (n=8), perfluorododecanoic acid (n=10) and perfluorooctadecanoic acid (n=16) were investigated. In these tests, a number of series of electromotors were provided with an oil barrier in the above-described manner. In all cases, a solution of approximately 0.1% by weight of perfluorocarboxylic acid in ethanol was used. The degree of surface coverage was measured by means of static SIMS. The layer thickness of the dried oil barrier was approximately 2 nm.

The electromotors were subjected to life tests. After testing for 2000 hours, one of the tested motors comprising the oil barrier of perfluorooctanoic acid (n=6) demonstrated a very small leakage. In the electromotors of the other series no leakages were observed. The best results were achieved with oil barriers of perfluorododecanoic acid (n=10) and perfluorooctadecanoic acid (n=16). By way of comparison, also a series of electromotors were tested which were not provided with an oil barrier. In a large number of motors of this series, leakages were observed already after 24 hours.

In other comparative experiments, an electromotor was provided with oil barriers comprising predominantly a perfluoroalkane silane compound of the type $C_6F_{13}(CH_2)_2Si(C_2H_5O)_3$. SSIMS measurements showed that the relative surface coverage of such monolayers is smaller than that obtained when the corresponding perfluorocarboxylic acids are used. Also the solution comprising perfluoroalkane silanes from which the monolayer is provided is less stable than that of the corresponding perfluorocarboyxlic acids.

In another experiment in accordance with the present invention a perfluoroalkylthiol was applied in the form of an oil barrier on an electromotor in the way as described above. In this case 1H, 1H, 2H, 2H, perfluorodecanthiol was used. This compound appeared to give similar results as the perfluorocarboxylic acid compounds.

The electromotors in accordance with the invention are provided with oil barriers which are composed of a monolayer comprising predominantly perfluorocarboxylic acid anions and/or perfluoroalkylthiol anions. This layer can be applied in a simple manner to the surface of the stator part and the rotor part by means of dipping. The oil barriers have a very small thickness and successfully counteract the spread of oil.

I claim:

1. An electromotor comprising a rotor part and a stator part, which parts are formed into a bearing system by means of oil-containing spiral groove bearings, whereby parts of the surface of the rotor part and of the stator part are provided with an oil barrier to counteract oil creepage from the bearings, characterized in that the oil barrier comprises a monolayer, which is predominantly composed of perfluorocarboxylic acid anions and/or of perfluoroalkylthiol anions.

2. An electromotor as claimed in claim 1, characterized in that the perfluorocarboxylic acid anions of the oil barrier have a chain length of 10 to 20 C-atoms.

3. An electromotor as claimed in claim 1, characterized in that the spiral groove portions of the bearings are also provided with the monolayer.

4. A method of manufacturing an electromotor as claimed in claim 1, characterized in that before the stator part and the rotor part are assembled into a motor, parts of the surface of the stator part and the rotor part are treated with a solution comprising a perfluorocarboxylic acid or perfluoroalkylthiol and/or a salt thereof.

5. A method as claimed in claim 4, characterized in that the stator part and the rotor part are subjected to a thermal treatment after they have been treated with the solution.

6. A method as claimed in claim 5, characterized in that the temperature treatment takes place at 60–90° C.

7. A method as claimed in claim 4, characterized in that the stator part and the rotor part are treated with the solution by means of dipping.

* * * * *